United States Patent
Watanabe et al.

(10) Patent No.: US 9,550,877 B2
(45) Date of Patent: Jan. 24, 2017

(54) THERMOSETTING RESIN COMPOSITION, METHOD FOR PRODUCING SAME, METHOD FOR PRODUCING CURED RESIN PRODUCT, AND METHOD FOR CAUSING SELF-POLYMERIZATION OF EPOXY COMPOUND

(71) Applicant: MITSUBISHI CHEMICAL CORPORATION, Tokyo (JP)

(72) Inventors: Takumi Watanabe, Yokohama (JP); Masato Andou, Yokohama (JP); Toshiyuki Tanaka, Yokohama (JP); Akinori Kimura, Yokohama (JP); Nobuhiko Ueno, Tokyo (JP); Maki Saito, Yokohama (JP); Phuong Thi Kim Dao, Yokohama (JP); Tetsuo Kasai, Yokohama (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/643,799

(22) Filed: Mar. 10, 2015

(65) Prior Publication Data

US 2015/0240070 A1    Aug. 27, 2015

Related U.S. Application Data

(63) Continuation of application No. PCT/JP2013/076396, filed on Sep. 27, 2013.

(30) Foreign Application Priority Data

Sep. 28, 2012 (JP) .................. 2012-217279
Aug. 27, 2013 (JP) .................. 2013-175645

(51) Int. Cl.
| | | |
|---|---|---|
| C08K 3/24 | (2006.01) |
| C08K 3/10 | (2006.01) |
| C08K 5/5419 | (2006.01) |
| C08K 5/5415 | (2006.01) |
| C08L 63/00 | (2006.01) |
| C08L 83/06 | (2006.01) |
| C08G 77/16 | (2006.01) |

(52) U.S. Cl.
CPC . *C08K 3/24* (2013.01); *C08K 3/10* (2013.01); *C08K 5/5415* (2013.01); *C08K 5/5419* (2013.01); *C08L 63/00* (2013.01); *C08L 83/06* (2013.01); *C08G 77/16* (2013.01); *C08L 2201/02* (2013.01)

(58) Field of Classification Search
CPC ....... C08L 63/00; C08L 83/06; C08L 2201/02; C08G 77/16; C08K 3/10; C08K 5/5415; C08K 5/5419
See application file for complete search history.

(56) References Cited

U.S. PATENT DOCUMENTS

| 3,812,214 A * | 5/1974 | Markovitz ............. C08G 59/70 252/600 |
|---|---|---|
| 4,322,513 A | 3/1982 | Wada et al. |
| 2005/0244649 A1* | 11/2005 | Kashiwagi ............. C08L 83/04 428/413 |

FOREIGN PATENT DOCUMENTS

| JP | 56-018643 | 2/1981 |
|---|---|---|
| JP | 08-041168 | 2/1996 |
| JP | 2007-332314 | 12/2007 |
| JP | 2008-56857 A | 3/2008 |
| JP | 2010-111756 | 5/2010 |
| JP | 2012-092172 | 5/2012 |

OTHER PUBLICATIONS

Extended European Search Report issued Sep. 1, 2015 in Patent Application No. 13840504.8.
International Search Report issued in International Application No. PCT/JP2013/076396, dated Sep. 27, 2013.
International Preliminary Report of Patentability and Written Opinion issued Apr. 9, 2015 in PCT/JP2013/076396 (English Translation only).
Combined Chinese Office Action and Search Report issued Feb. 19, 2016 in Patent Application No. 201380050393.0 (with English Translation).
Chinese Second Office Action issued in the corresponding Chinese Patent Application No. 201380050393.0 on Oct. 25, 2016 with its English translation, 10 pp.

\* cited by examiner

*Primary Examiner* — Robert Jones, Jr.
(74) *Attorney, Agent, or Firm* — Oblon, McClelland, Maier & Neustadt, L.L.P.

(57) ABSTRACT

The present invention is directed to provide at least one of a novel thermosetting resin composition using an epoxy compound, a method for producing the composition, a method for producing a novel cured resin using an epoxy compound, and a novel method for causing self-polymerization of an epoxy compound. The thermosetting resin composition includes an epoxy compound, a gallium compound, and a silanol source compound. The method for producing the thermosetting resin composition includes a step of mixing the epoxy compound with the gallium compound and the silanol source compound. The method for producing a cured resin includes a step of heating an epoxy compound in the presence of a gallium compound and silanol. The method for causing self-polymerization of an epoxy compound is characterized by using a gallium compound and silanol as catalysts.

15 Claims, 5 Drawing Sheets

THERMOSETTING RESIN COMPOSITION, METHOD FOR PRODUCING SAME, METHOD FOR PRODUCING CURED RESIN PRODUCT, AND METHOD FOR CAUSING SELF-POLYMERIZATION OF EPOXY COMPOUND

CROSS-REFERENCE TO RELATED APPLICATION

This is a continuation of International Application PCT/JP2013/076396, filed on Sep. 27, 2013, and designated the U.S., (and claims priority from Japanese Patent Application 2012-217279 which was filed on Sep. 28, 2012 and Japanese Patent Application 2013-175645 which was filed on Aug. 27, 2013) the entire contents of which are incorporated herein by reference.

TECHNICAL FIELD

The present invention relates to a novel thermosetting resin composition, a method for producing the composition, a method for producing a cured resin, and a method for causing self-polymerization of an epoxy compound.

BACKGROUND ART

Epoxy resins and silicone resins (also referred to as polysiloxane resins) are used as encapsulants for semiconductor devices such as light emitting diodes (LED) or as a matrix having a phosphor distributed therein in white LED. Hybrid resins that include a silicone resin in combination with an epoxy resin also have been developed (Patent Documents 1, 2, and 3). Furthermore, depending on the application, mixing an additive such as silica into the above resins has been also contemplated.

Typical and well known curing agents for epoxy resins include polyamine-based curing agents, carboxylic acid anhydride-based curing agents, and phenol resin-based curing agent. These curing agents are a compound that has a functional group that reacts with an epoxy group. Other curing agents include the types of agents that catalyze the self-polymerization reaction (cationic polymerization reaction involving ring-opening) of an epoxy group. Such types of curing agents include combinations of silanol and a metal complex (a complex that contains Ti, V, Cr, Mn, Fe, Co, Ni, Cu, Zn, Al, or Zr) (Patent Documents 4 and 5).

As curing catalysts for condensation-cured silicone resins, gallium compounds are known (Patent Document 6).

PRIOR ART DOCUMENT

Patent Documents

Patent Document 1: Japanese Patent Application Laid-Open No. H8-41168
Patent Document 2: Japanese Patent Application Laid-Open No. 2007-332314
Patent Document 3: Japanese Patent Application Laid-Open No. 2012-92172
Patent Document 4: Japanese Patent Application Laid-Open No. S56-18643
Patent Document 5: Japanese Patent Publication No. S58-017537
Patent Document 6: Japanese Patent Application Laid-Open No. 2010-111756

DISCLOSURE OF THE INVENTION

Problems to be Solved by the Invention

A principal object of the present invention is to provide at least one of a novel thermosetting resin composition using an epoxy compound, a method for producing the composition, a method for producing a novel cured resin using an epoxy compound, and a novel method for causing self-polymerization of an epoxy compound. Another object of the invention is to provide a resin composition that is suitable for use in providing a cured product formed by imparting an additional property to provision of the novel thermosetting resin composition.

Means of Solving the Problems

The present inventors have found that a composition produced by adding a catalytic amount of gallium acetylacetonate and a compound that contains silanol to a cycloaliphatic bifunctional epoxy compound has thermosetting properties, thereby completing the invention.

The present invention has the following aspects:
(1) A thermosetting resin composition that includes an epoxy compound, a gallium compound, and a silanol source compound.
(2) A method for producing a thermosetting resin composition, the method including a step of mixing a gallium compound and a silanol source compound into an epoxy compound.
(3) A method for producing a cured resin, the method including a step of heating an epoxy compound in the presence of a gallium compound and silanol.
(4) A method for causing self-polymerization of an epoxy compound, the method including a step of adding a gallium compound and silanol as catalysts.

Effects of the Invention

The present invention provides at least one of a novel thermosetting resin composition using an epoxy compound, a method for producing the composition, a method for producing a novel cured resin using an epoxy compound, and a novel method for causing self-polymerization of an epoxy compound. Provision of such composition allows properties such as high strength, thermal resistance, stable linear expansion and elasticity over a wide range of temperatures, to be imparted to the cured product.

MODE FOR CARRYING OUT THE INVENTION

Figure 1:
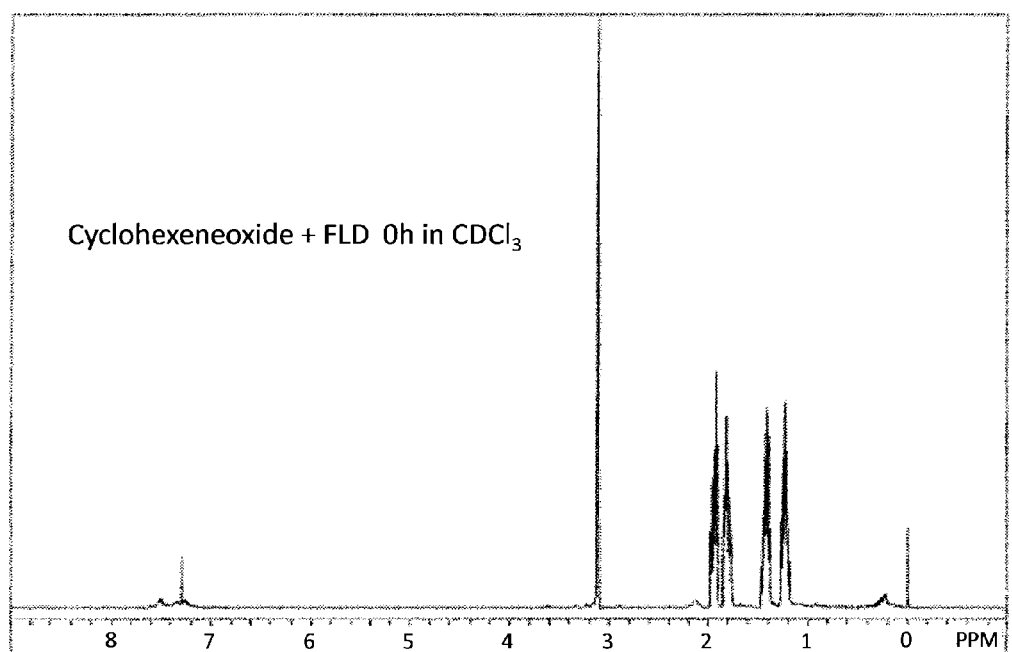
FIG. 1 shows a $^1$H-NMR spectrum of Sample 1.
Figure 2:
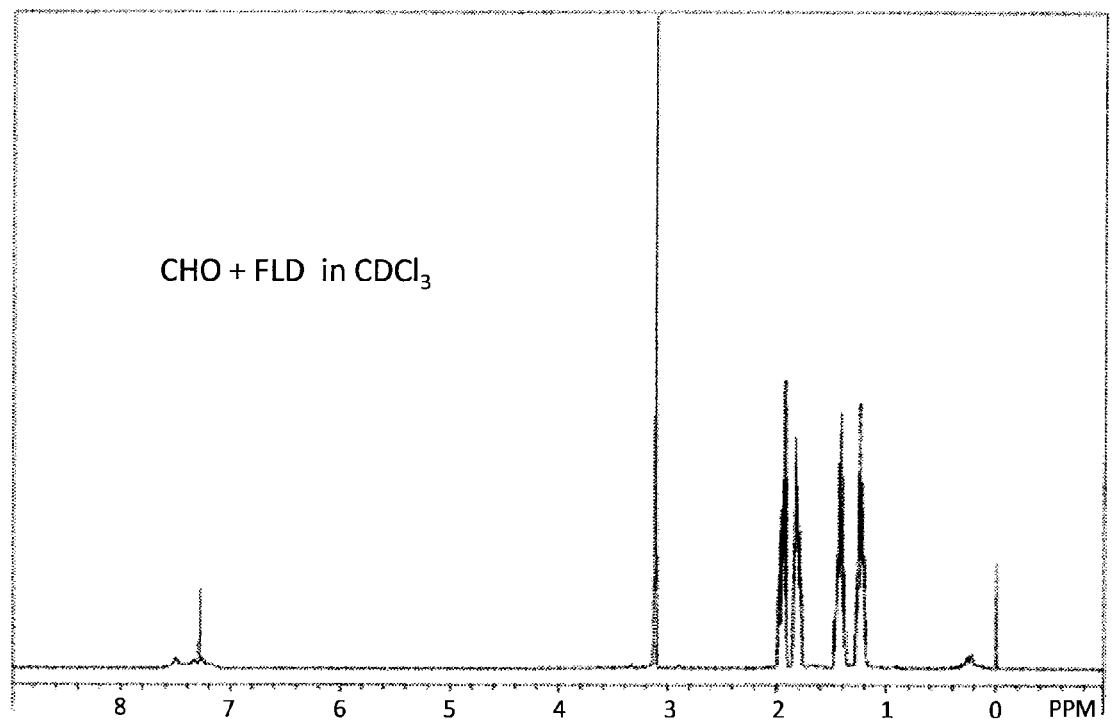
FIG. 2 shows a $^1$H-NMR spectrum of Sample 2.
Figure 3:
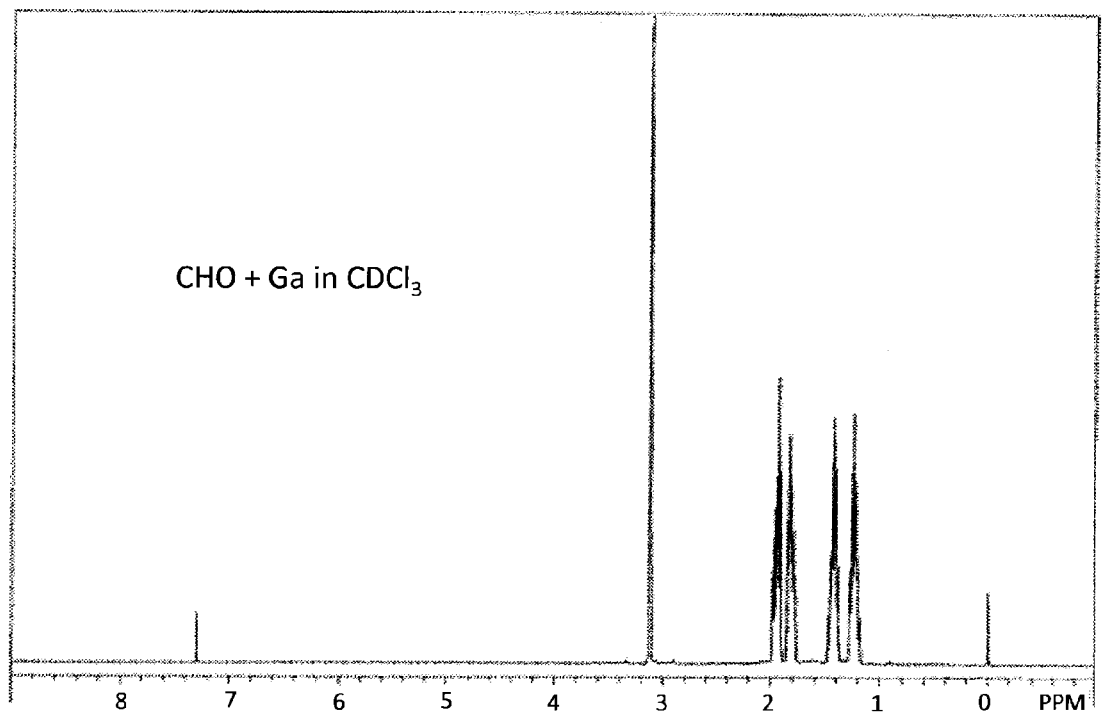
FIG. 3 shows a $^1$H-NMR spectrum of Sample 3.
Figure 4:
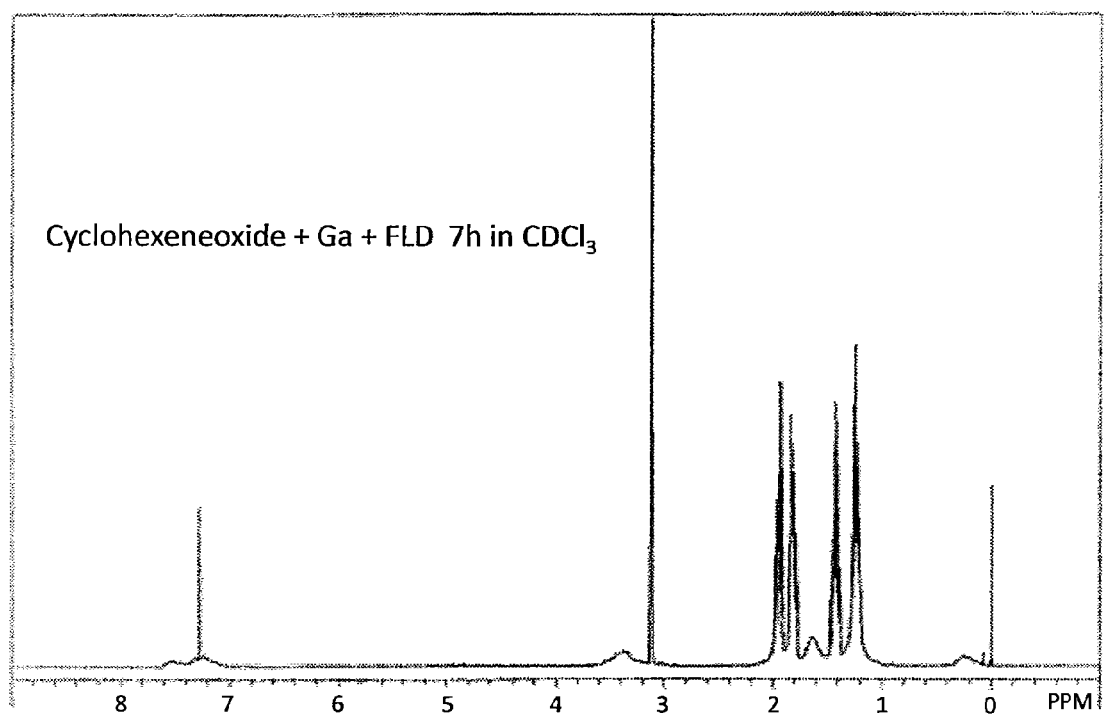
FIG. 4 shows a $^1$H-NMR spectrum of Sample 4.

Now, the present invention will be described with reference to embodiments, although the present invention is not limited to embodiments explicitly or implicitly described herein. And various modifications may be made without departing from the spirit of the invention.

1. Thermosetting Resin Composition

The thermosetting resin composition of the present invention includes (A) an epoxy compound, (B) a gallium compound, and (C) a silanol source compound. The thermosetting resin composition may include a component other than the components (A)-(C), if necessary.

The thermosetting resin composition has a curing mechanism at least partially involving the self-polymerization reaction of the epoxy compound, the reaction catalyzed by the gallium compound and silanol derived from the silanol source compound. The thermosetting resin composition may be cured only by such self-polymerization reaction, although the curing mechanism is not limited thereto.

Now, each of the components of the thermosetting resin composition will be described.

1.1 (A) Epoxy Compound

The epoxy compound is a compound that has an epoxy group in the molecule and preferably a cycloaliphatic epoxy compound that has a cyclohexyl epoxy group. Exemplary structures of typical cycloaliphatic epoxy compounds are represented by Formulas (1)-(3).

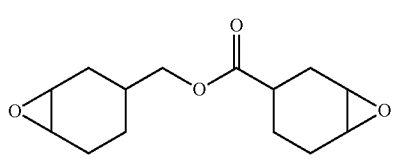

(1)

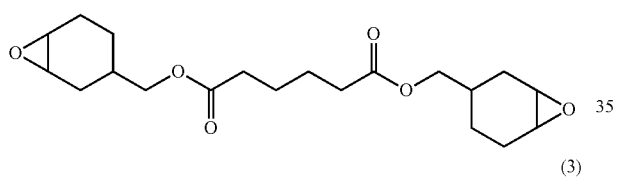

(2)

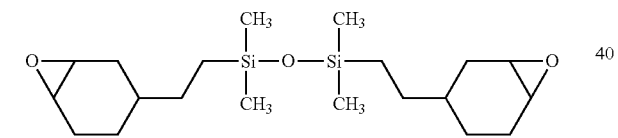

(3)

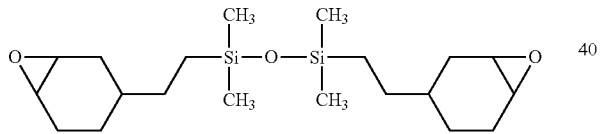

Although the epoxy compound may be a compound that has a glycidyl group, such compound can have lower activity of the self-polymerization reaction, compared with the cycloaliphatic epoxy compounds.

Suitable examples of the epoxy compounds that have a glycidyl group include glycidyl ether or ester compounds that have a cycloaliphatic structure as represented by Formulas (4)-(8), glycidyl ether compounds that do not have a cycloaliphatic structure as represented by Formula (9), glycidyl ether compounds that have a disiloxane backbone as represented by Formula (10), and glycidyl amide compounds that have an isocyanuric acid backbone as represented by Formula (11).

(4)

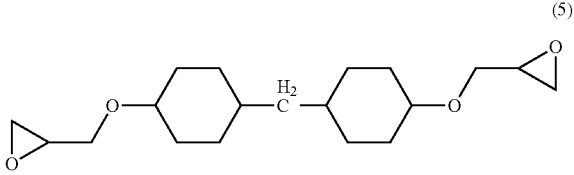

(5)

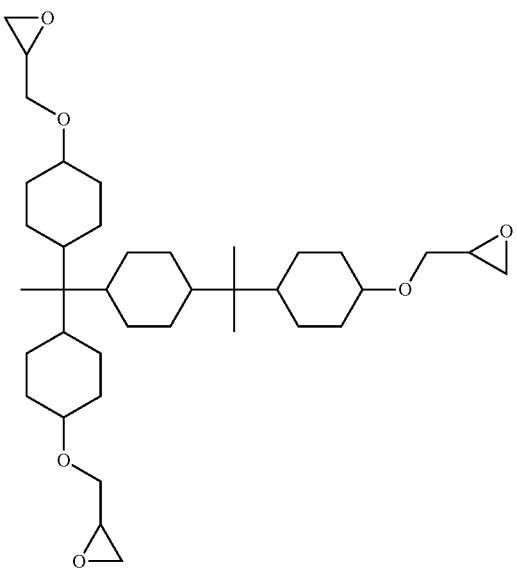

(6)

(7)

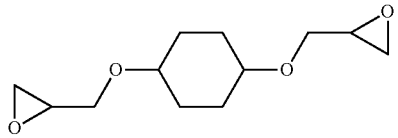

(8)

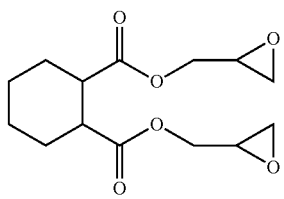

(9)

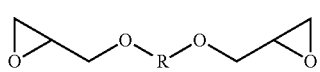

(10)

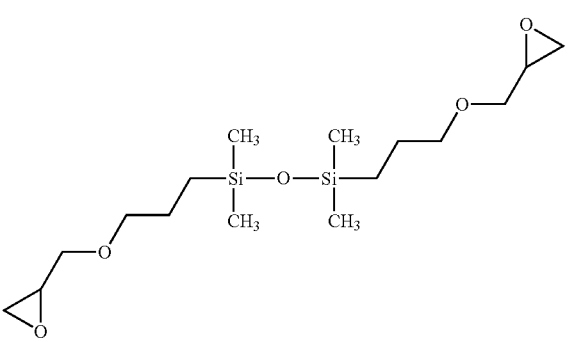

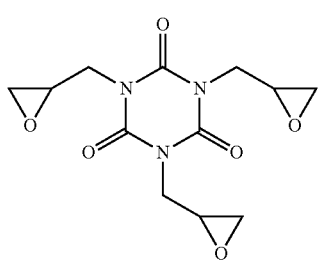

(11)

The epoxy compound may also be an aromatic epoxy compound. Examples of such epoxy compound include bisphenol epoxy resins as represented by Formula (12) formed by glycidylating a bisphenol such as bisphenol A, bisphenol F, bisphenol AD, bisphenol S, tetramethyl bisphenol A, tetramethyl bisphenol F, tetramethyl bisphenol AD, tetramethyl bisphenol S, and tetrafluoro bisphenol A; biphenyl epoxy resins as represented by Formula (13); epoxy resins formed by glycidylating a dihydric phenol such as dihydroxy naphthalene and 9,9-bis(4-hydroxyphenyl)fluorene; epoxy resins formed by glycidylating a trisphenol such as 1,1,1-tris(4-hydroxyphenyl)methane; epoxy resins formed by glycidylating a tetrakisphenol such as 1,1,2,2-tetrakis(4-hydroxyphenyl)ethane; and novolac epoxy resins formed by glycidylating a novolac such as phenol novolac, cresol novolac, bisphenol A novolac, and brominated bisphenol A novolac.

The epoxy compound may be an epoxy compound that has a cycloaliphatic structure, obtained by hydrogenating an aromatic epoxy compound.

The epoxy compound may be a silicon-containing compound that has an epoxy group. Examples of the silicon-containing compound are silane compounds and siloxane compounds.

The examples of the silicon-containing compound that has an epoxy group include γ-glycidoxypropyl trimethoxysilane, γ-glycidoxypropyl triethoxysilane, 2-(3,4-epoxycyclohexyl)ethyl trimethoxysilane, 2-(3,4-epoxycyclohexyl)ethyl triethoxysilane, (γ-glycidoxypropyl) (methyl) dimethoxysilane, (γ-glycidoxypropyl) (ethyl) dimethoxysilane, (γ-glycidoxypropyl) (methyl) diethoxysilane, (γ-glycidoxypropyl) (ethyl)diethoxysilane, [2-(3,4-epoxycyclohexyl) ethyl](methyl)dimethoxysilane, [2-(3,4-epoxycyclohexyl)ethyl](ethyl)dimethoxysilane, [2-(3,4-epoxycyclohexyl)ethyl](methyl)diethoxysilane, [2-(3,4-epoxycyclohexyl)ethyl](ethyl)diethoxysilane, (γ-glycidoxypropyl) (methoxy)dimethylsilane, (γ-glycidoxypropyl) (methoxy)diethylsilane, (γ-glycidoxypropyl) (ethoxy)dimethylsilane, (γ-glycidoxypropyl) (ethoxy)diethylsilane, [2-(3,4-epoxycyclohexyl)ethyl](methoxy)dimethylsilane, [2-(3,4-epoxycyclohexyl)ethyl](methoxy)diethylsilane, [2-(3,4-epoxycyclohexyl)ethyl](ethoxy)dimethylsilane, [2-(3,4-epoxycyclohexyl)ethyl](ethoxy)diethylsilane, [2-(3,4-epoxycyclohexyl)ethyl](dimethyl)disiloxane, and 3-epoxypropyl(phenyl)dimethoxysilane.

Examples of the silicon compound that contains an epoxy group also include organopolysiloxanes represented by Formula (14).

$$(R^{11}_3SiO_{1/2})_{a1}(R^{12}_2SiO_{2/2})_{b1}(R^{13}SiO_{3/2})_{c1}(SiO_{4/2})_{d1}(O_{1/2}H)_{e1} \quad (14)$$

In Formula (14), $R^{11}$, $R^{12}$, and $R^{13}$ each independently represent a monovalent organic group, and at least one of $R^{11}$, $R^{12}$, and $R^{13}$ in the molecule is an organic group that contains an epoxy group.

In Formula (14), $R^{11}_3SiO_{1/2}$, $R^{12}_2SiO_{2/2}$, $R^{13}SiO_{3/2}$, and $SiO_{4/2}$ respectively represent an M unit, a D unit, a T unit, and a Q unit. a1, b1, c1, and d1 are each an integer of 0 or more and satisfy the condition of a1+b1+c1+d1≥3.

In Formula (14), $R^{11}$, $R^{12}$, and $R^{13}$ are preferably a $C_{1-10}$ hydrocarbon group. Specific examples of such group include alkyl groups such as a methyl group, an ethyl group, a propyl group, a butyl group, a pentyl group, a hexyl group, and a heptyl group; alkenyl groups such as a vinyl group, an allyl group, a butenyl group, a pentenyl group, and a hexenyl group; aryl groups such as a phenyl group, a tolyl group, and a xylyl group; aralkyl groups such as a benzyl group and a phenethyl group; and substituted alkyl groups such as a chloromethyl group, a 3-chloropropyl group, a 3,3,3-trifluoropropyl group, and a nonafluorobutylethyl group.

In Formula (14), examples of the organic group that contains an epoxy group include epoxy alkyl groups such as a 2,3-epoxypropyl group, a 3,4-epoxy butyl group, and a 4,5-epoxy pentyl group; glycidoxyalkyl groups such as a 2-glycidoxyethyl group, a 3-glycidoxypropyl group, and a 4-glycidoxybutyl group; and epoxycyclohexyl alkyl groups such as a β-(or 2-)(3,4-epoxycyclohexyl)ethyl group and a γ-(or 3-)(3,4-epoxycyclohexyl)propyl group.

In Formula (14), e1 is an integer of 0 or more and represents the number of hydroxy group(s) directly bonded to a silicon atom (silanol).

The epoxy compound may be a compound that has a hydrolyzable group bonded to a silicon atom such that when the hydrolyzable group is hydrolyzed, an organopolysiloxane represented by Formula (14) (provided that e1 is an integer of 1 or more) is yielded. In other words, the epoxy compound may be a compound that has a structure in which

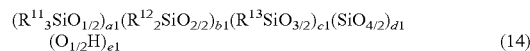

(12)

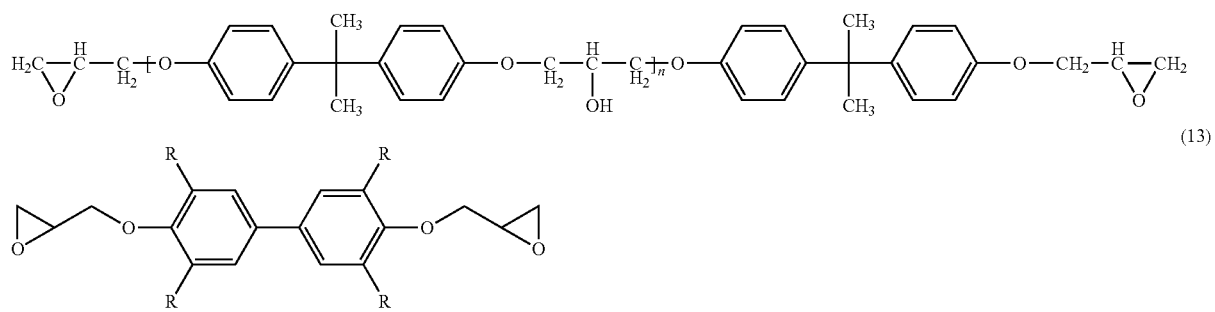

(13)

all or part of the hydroxy group(s) directly bonded to a silicon atom of an organopolysiloxane represented by Formula (14) (provided that e1 is an integer of 1 or more) is substituted with a hydrolyzable group.

As used herein, the term hydrolyzable group refers to a group that yields a hydroxy group bonded to a silicon atom (silanol) on hydrolysis. Specific examples of the hydrolyzable group include a hydroxy group, alkoxy groups, hydrogen, an acetoxy group, an enoxy group, an oxime group, and halogen groups. Preferred hydrolyzable groups are alkoxy groups, especially $C_{1-3}$ alkoxy groups, that is, a methoxy group, an ethoxy group, and a propoxy group.

The organopolysiloxane epoxy compounds represented by above Formula (14) can be produced by, for example, the following method.

(Method 1) A method of cohydrolyzing and polycondensing a silane compound that has an epoxy group and a silane compound that is free of epoxy groups and/or an oligomer thereof.

(Method 2) A method of adding an organic compound that has an epoxy group and a carbon-carbon double bond group to a polysiloxane that has a hydrosilyl group.

(Method 3) A method of oxidizing a carbon-carbon double bond of a polysiloxane that has an organic group having a carbon-carbon double bond to produce an epoxy group.

In production of the polysiloxane epoxy compounds according to Method 1, the following materials can be used.

Examples of materials for introduction of the M unit include trimethylmethoxysilane, trimethylethoxysilane, triphenylmethoxysilane, and triphenylsilanol.

Examples of materials for introduction of the D unit include dimethyldimethoxysilane, methylphenyldimethoxysilane, methylvinyldimethoxysilane, diphenyldimethoxysilane, dimethyldiethoxysilane, and methylphenyldiethoxysilane, and hydrolytic condensation products (oligomers) thereof.

As dialkylsiloxane oligomers that have a hydroxy group at both ends, compounds such as polydimethylsiloxane, polymethylphenylsiloxane, dimethylsiloxane-diphenylsiloxane copolymers, and polydiphenylsiloxane that are terminated with silanol at both ends are commercially available.

Examples of materials for introduction of the T unit include methyltrimethoxysilane, methyltriethoxysilane, ethyltrimethoxysilane, ethyltriethoxysilane, vinyltrimethoxysilane, phenyltrimethoxysilane, and 3,3,3-trifluoropropyl trimethoxysilane, and hydrolytic condensation products thereof.

Examples of materials for introduction of the Q unit include tetramethoxysilane, tetraethoxysilane, and tetrapropoxysilane, and hydrolytic condensation products thereof.

Examples of materials for introduction of an epoxy group include γ-glycidoxypropyl trimethoxysilane, γ-glycidoxypropyl triethoxysilane, 2-(3,4-epoxycyclohexyl)ethyl trimethoxysilane, 2-(3,4-epoxycyclohexyl)ethyl triethoxysilane, (γ-glycidoxypropyl) (methyl)dimethoxysilane, (γ-glycidoxypropyl) (ethyl)dimethoxysilane, (γ-glycidoxypropyl) (methyl)diethoxysilane, (γ-glycidoxypropyl) (ethyl)diethoxysilane, [2-(3,4-epoxycyclohexyl ethyl](methyl)dimethoxysilane, [2-(3,4-epoxycyclohexyl)ethyl](ethyl)dimethoxysilane, [2-(3,4-epoxycyclohexyl)ethyl](methyl) diethoxysilane, [2-(3,4-epoxycyclohexyl)ethyl](ethyl) diethoxysilane, (γ-glycidoxypropyl) (methoxy) dimethylsilane, (γ-glycidoxypropyl) (methoxy) diethylsilane, (γ-glycidoxypropyl) (ethoxy)dimethylsilane, (γ-glycidoxypropyl) (ethoxy)diethylsilane, [2-(3,4-epoxycyclohexyl)ethyl](methoxy)dimethylsilane, [2-(3,4-epoxycyclohexyl)ethyl](methoxy)diethylsilane, [2-(3,4-epoxycyclohexyl)ethyl](ethoxy)dimethylsilane, [2-(3,4-epoxycyclohexyl)ethyl](ethoxy)diethylsilane, [2-(3,4-epoxycyclohexyl)ethyl](dimethyl)disiloxane, and 3-epoxypropyl(phenyl)dimethoxysilane.

1.2 (B) Gallium Compound

The gallium compound is a compound that functions as a catalyst for self-polymerization reaction of the epoxy compound, in combination with silanol derived from the silanol source compound described in detail below.

The gallium compound may be any compound, as long as it has the catalytic function described above. The gallium compound can be selected from gallium complexes that have a chelating ligand, gallium acetate, gallium oxyacetate, triethoxy gallium, tris(8-quinolinato)gallium, gallium oxalate, gallium ethylxanthate, diethyl ethoxy gallium, gallium maleate, or gallium salts of long chain carboxylic acids such as n-octylate, 2-ethylhexanoates, and naphthenates.

Examples of the chelating ligand include β-diketone compounds and o-ketophenol compounds. Examples of the β-diketone compounds include those that have a structure represented by the following Formulas (15)-(17).

In Formulas (15)-(17), R represents an alkyl group or a halogen-substituted alkyl group.

Specific examples of the compounds of Formula (15) include acetylacetone, trifluoroacetylacetone, pentafluoroacetylacetone, and hexafluoroacetylacetone. A specific example of the compounds of Formula (16) includes ethyl acetoacetate. A specific example of the compound of Formula (17) includes diethyl malonate.

The o-ketophenol compounds are a compound represented by the following Formula (18).

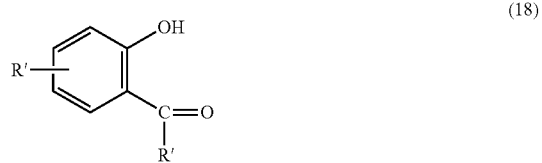

In Formula (18), R' represents a hydrogen atom, an alkyl group, a halogen-substituted alkyl group, or an alkoxy group.

Specific examples of the compounds of Formula (18) include salicylaldehyde and ethyl-O-hydroxyphenyl ketone.

The gallium complexes that have a chelating ligand are a suitable example of the gallium compounds. Among them, gallium acetylacetonate is especially suitable.

Use of a Ga catalyst causes less weight loss on heating a cured product, compared with use of an Al catalyst. Especially, in a case in which a cured product includes a siloxane structure, use of a Ga catalyst causes less weight loss on heating the cured product, compared with use of an Al catalyst.

Specifically, a cured product heated at 150-200° C. for 500 hours loses its weight preferably by 20% by mass or less and more preferably by 10% by mass or less, compared with its weight before heating.

The gallium compound (B) is usually contained in an amount of 0.001 parts by weight or more and preferably 0.01 parts by weight or more, and 5.0 parts by weight or less and preferably 1.0 parts by weight or less, based on 100 parts by weight of the epoxy compound (A).

1.3 (C) Silanol Source Compound

The silanol source compound is a source of silanol. The silanol functions as a catalyst for self-polymerization reaction of the epoxy compound, in combination with the above gallium compound.

The silanol is believed to function as a source of a cation necessary for initiation of the self-polymerization reaction of the epoxy compound. In a case in which a silicon atom of the silanol source compound is bonded to an aromatic group such as a phenyl group, the aromatic group is believed to function to enhance the acidity of a silanol hydroxy group, that is, to enhance the silanol's function as a source of a cation.

The silanol source compound may be a potential silanol source. For example, the silanol source compound may have a silicon atom that is bonded to a hydrolyzable group that yields silanol on hydrolysis. Specific examples of the hydrolyzable group include a hydroxy group, alkoxy groups, hydrogen, an acetoxy group, an enoxy group, an oxime group, and halogen groups.

Preferred hydrolyzable groups are alkoxy groups, especially $C_{1-3}$ alkoxy groups, that is, a methoxy group, an ethoxy group, and a propoxy group.

Examples of the silanol source compound include monosilane compounds that have a silicon atom that is bonded to a hydroxy group, such as phenyldimethylsilanol, diphenylmethylsilanol, triphenylsilanol, dihydroxydiphenylsilane (diphenyldisilanol), trimethylsilanol, triethylsilanol, dihydroxydimethylsilane, and trihydroxymethylsilane.

Other examples of the silanol source compound include organopolysiloxanes that have a silicon atom that is bonded to a hydroxy group, as represented by Formula (19).

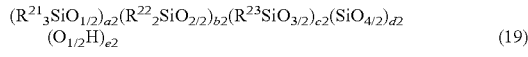
(19)

In Formula (19), $R^{21}$, $R^{22}$, and $R^{23}$ each independently represent a monovalent organic group.

In Formula (19), $R^{21}_3SiO_{1/2}$, $R^{22}_2 SiO_{2/2}$, $R^{23}SiO_{3/2}$, and $SiO_{4/2}$ respectively represent an M unit, a D unit, a T unit, and a Q unit. a2, b2, c2, and d2 are each an integer of 0 or more and satisfy the condition of a2+b2+c2+d2≥3. e2 is a natural number of 1 or more and represents the number of a hydroxy group(s) directly bonded to a silicon atom (silanol).

In Formula (19), $R^{21}$, $R^{22}$, and $R^{23}$ are usually a $C_{1-10}$ hydrocarbon group. Specific examples of such group include alkyl groups such as a methyl group, an ethyl group, a propyl group, a butyl group, a pentyl group, a hexyl group, and a heptyl group; alkenyl groups such as a vinyl group, an allyl group, a butenyl group, a pentenyl group, and a hexenyl group; aryl groups such as a phenyl group, a tolyl group, and a xylyl group; aralkyl groups such as a benzyl group and a phenethyl group; and substituted alkyl groups such as a chloromethyl group, a 3-chloropropyl group, a 3,3,3-trifluoropropyl group, and a nonafluorobutylethyl group.

The silanol source compound may have a hydrolyzable group that is bonded to a silicon atom such that when the hydrolyzable group is hydrolyzed, an organopolysiloxane represented by Formula (19) is yielded. In other words, the silanol source compound may have a structure in which all or part of the hydroxy group(s) directly bonded to a silicon atom of an organopolysiloxane represented by Formula (19) is substituted with a hydrolyzable group.

In a case in which the silanol source compound is an organopolysiloxane and is used in combination with an epoxy compound that does not have a siloxane structure, the organopolysiloxane preferably has an aromatic group that is bonded to a silicon atom, in order to impart the compatibility of the organopolysiloxane with the epoxy compound.

In a case in which the silanol source compound is an organopolysiloxane, the compound preferably has a weight-average molecular weight of 500 or more and more preferably 700 or more, in order to prevent volatilization of the compound during or after curing the thermosetting resin composition. And the compound preferably has a weight-average molecular weight of 20,000 or less and more preferably 15,000 or less, because a silanol source compound having an extremely high degree of polymerization has reduced handleability due to increased viscosity.

In a preferred embodiment, the silanol source compound may be an organopolysiloxane or a silane compound that have, per molecule, two or more silicon atoms that are bonded to a hydroxy group or a hydrolyzable group. When such silanol source compound is heated, the compound is polycondensed by the action of the gallium compound to form a higher molecular weight product. Thus, the compound does not bleed out after curing.

Preferred examples of organopolysiloxanes that can be used as the silanol source compound include those having a structure represented by above Formula (2) and Formulas (20)-(23).

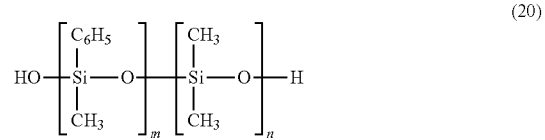
(20)

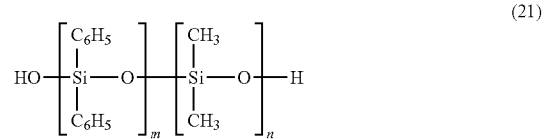
(21)

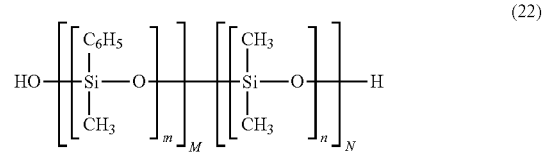
(22)

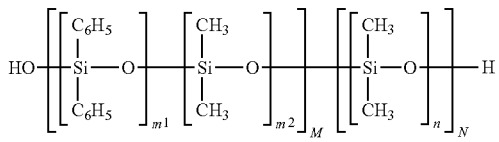

(23)

The organopolysiloxanes represented by Formula (22) can be obtained by polycondensing a compound represented by Formula (2) with a compound represented by Formula (24) (dihydroxydimethylsilane or polydimethylsiloxane that has a hydroxy group at both ends). As the polycondensation catalyst, an acid, a base, or a metal catalyst can be used, and a gallium compound such as gallium acetoacetonate can also be used.

The organopolysiloxanes represented by Formula (23) can be obtained by polycondensing a compound represented by Formula (21) with a compound represented by Formula (24). As the polycondensation catalyst, an acid, a base, or a metal catalyst can be used, and a gallium compound such as gallium acetoacetonate can also be used.

(24)

In Formulas (20)-(24), m, n, M, N, m1, and m2 are each an integer of 1 or more. It should be noted that in a case in which these numbers are extremely high, that is, in a case in which the polysiloxanes have an extremely high degree of polymerization, the compounds have an extremely high viscosity that leads to reduced handleability and a reduced silanol content, which tends to reduce the catalytic capacity. In view of the handleability, it is preferred to set the degree of polymerization such that the organopolysiloxanes or the thermosetting resin composition obtained by using any of the organopolysiloxanes preferably have a viscosity of 10000 mPa·s or less and especially 5000 mPa·s or less.

An organopolysiloxane obtained by polycondensing at least one selected from the organopolysiloxanes represented by Formula (2) and Formulas (20)-(23) with a trifunctional silane compound such as methyltrimethoxysilane and phenyltrimethoxysilane is also suitable as the silanol source compound (C). As the polycondensation catalyst, an acid, a base, or a metal catalyst can be used, and a gallium compound such as gallium acetoacetonate can also be used. Such organopolysiloxanes also have the property of curing with a condensation catalyst such as an acid, a base, or a metal compound including gallium compounds. As the silanol source, a monosilane compound is used in combination with any of the organopolysiloxanes.

The silanol source compound (C) is usually contained in an amount of 0.05 parts by weight or more and preferably 0.5 parts by weight or more, and 500 parts by weight or less and preferably 200 parts by weight or less, based on 100 parts by weight of the epoxy compound (A).

The weight ratio of the gallium compound (B) to the silanol source compound (C) is preferably 1:0.05-0.001:100 and more preferably 1:10-0.01:100.

1.4 Epoxy Silicone Resin

In the thermosetting resin composition according to an embodiment of the present invention, one or both of the epoxy compound and the silanol source compound may have an organopolysiloxane structure moiety. In such case, introduction of silanol into the organopolysiloxane structure moiety allows the gallium compound to function as a catalyst for dehydration-condensation between the silanol groups, thereby providing a thermosetting resin composition that has a curing mechanism involving both of the self-polymerization reaction of the epoxy compound and the condensation reaction of the silanol and that has a high thermal resistance. The gallium compound can also function as a catalyst for a dealcoholization-condensation reaction between silanol and an alkoxy group, and thus introduction of a silanol and an alkoxy group into the organopolysiloxane structure moiety has the similar effect.

As another example, introduction of a hydrosilyl group into one of an organopolysiloxane structure moiety in the epoxy compound or an organopolysiloxane structure moiety in the silanol source compound, introduction of a vinylsilyl group into the other moiety, and addition of a catalyst, such as a platinum compound, for a hydrosilation reaction provide a thermosetting resin composition that has a curing mechanism involving both of the self-polymerization reaction and the hydrosilation reaction of the epoxy compound and that has a good curability.

Alternatively, introduction of a hydrosilyl group into an organopolysiloxane structure moiety in one or both of the epoxy compound and the silanol source compound and addition of an organopolysiloxane that has a vinylsilyl group and a catalyst for hydrosilation reaction can also provide a thermosetting resin composition that has a curing mechanism involving both of the self-polymerization reaction and the hydrosilation reaction of the epoxy compound. As a modification, a vinylsilyl group may be introduced into an organopolysiloxane structure moiety in one or both of the epoxy compound and the silanol source compound, and the organopolysiloxane added may be an organopolysiloxane that has a hydrosilyl group.

1.5 Other Components

In addition to the above components, the thermosetting resin composition according to an embodiment of the present invention may further include an additive such as a dispersing agent, an antioxidant, a defoamer, a coloring agent, a denaturant, a leveling agent, a light scattering agent, a heat transfer agent, a flame retardant, a reactive or unreactive diluent, and an adhesion promoter, and any of various fillers, in order to, for example, improve the physical properties and impart functionality.

1.5.1 Filler

As a filler, any of common organic and inorganic fillers can be used. Examples of the organic fillers include synthetic polymer particles such as styrene-based polymer particles, methacrylate-based polymer particles, ethylene-based polymer particles, propylene-based polymer particles, and polyamide-based polymer particles, natural products such as starch and wood flour, unmodified or modified celluloses, and various organic pigments. The inorganic fillers are not specifically limited, as long as they are an inorganic material or a compound that contains an inorganic material. The specific examples can include silica-based inorganic fillers such as silica glass, fumed silica, precipitated silica, silicic anhydride, fused silica, crystalline silica, and ultrafine amorphous silica, alumina, zircon, iron oxide, zinc oxide, titanium oxide, silicon nitride, boron nitride, aluminum nitride, silicon carbide, glass fibers, glass flakes, alumina fibers, carbon fibers, mica, black lead, carbon black, ferrite, graphite, diatomaceous earth, white earth, clay, talc, aluminum hydroxide, calcium carbonate, manganese carbonate, magnesium carbonate, barium sulfate, potassium titanate, calcium silicate, inorganic balloons, and silver powder.

These filers may be used alone or in combination of two or more thereof. The filler(s) may be surface-treated, if appropriate. Examples of the surface treatment include, but not limited to, alkylation treatment, trimethylsilylation treatment, silicone treatment, and treatment with a silane coupling agent.

The amount of the filler(s) added is not specifically limited.

Use of the filler(s) allows the improvement of various physical properties such as strength, hardness, modulus, thermal expansion, thermal conductivity, heat dissipation, electrical properties, light reflectance, flame retardancy, fire resistance, thixotropy, and gas barrier properties of the resultant moldings.

The order of mixing of the filler(s) is not specifically limited, but desirably, the filler(s) are mixed with the epoxy compound in the absence of the gallium compound, the silanol source compound, and another catalyst used for curing the epoxy resin, in order to prevent the progress of curing reaction due to heat generation during mixing.

Specific examples of means to mix the filler(s) include, but not limited to, stirrers such as two- or three-roll mills, planetary stirring defoamers, homogenizers, dissolvers, and planetary mixers, and melt-kneading machines such as Plastomill. The filler(s) are mixed at normal temperature or under heating and at normal pressure or under reduced pressure. When the filler(s) are mixed at high temperature, the composition can be cured before molding.

In a case in which the resin composition of the present invention is used as an encapsulant, an inorganic filler, especially silica fine particles can be added, primarily in order to reduce differential thermal expansion between the encapsulant and an adjacent member. Addition of an increased amount of such filler can produce the greater effect, and such filler is desirably added in an amount of 40 parts by weight or more, preferably 70 parts by weight or more, and more preferably 80 parts by weight or more, based on 100 parts by weight of the epoxy resin. In order to increase the amount to be added, control of the particle size distribution is often used. Mixing of fillers having different particle diameters provides a higher loading.

Addition of an increased amount of the filler results in significant increase in the viscosity of the composition. Depending on the application and the molding method, it is necessary to suppress increase in the viscosity. In this case, the shape and the surface structure of the filler have a large influence. Selection of the shape from a spherical shape rather than fibrous or irregular shapes allows the viscosity to be kept low. Selection of the type and the amount of functional groups on the particle surfaces allows the control of the interaction between the particles and between the matrix compositions that include, for example, the particles and the epoxy resin, thereby providing an appropriate viscosity.

1.5.2 Antioxidant

The thermosetting resin composition according to an embodiment of the present invention can include an antioxidant in order to prevent yellowing in a use environment.

Preferably, a phenol-based antioxidant, a phosphorus-based antioxidant, and/or a hindered amine-based antioxidant are used. Among them, it is especially preferred to use a hindered phenol-based antioxidant that has an alkyl group in one or both ortho-positions of a phenolic hydroxyl group.

1.5.3 Curing Catalyst for Epoxy Resin

A catalyst usually used for curing an epoxy resin can also be used, as long as such catalyst does not impair the catalyst function of the gallium compound and the silanol derived from the silanol source compound. Examples of such catalyst include tertiary amines such as benzyldimethylamine, 2,4,6-tris(dimethylaminomethyl)phenol, cyclohexyldimethylamine, and triethanolamine; imidazoles such as 2-methylimidazole, 2-n-heptylimidazole, 2-n-undecylimidazole, 2-phenylimidazole, 2-phenyl-4-methylimidazole, 1-benzyl-2-methylimidazole, 1-benzyl-2-phenylimidazole, 1,2-dimethylimidazole, 2-ethyl-4-methylimidazole, 1-(2-cyanoethyl)-2-methylimidazole, 1-(2-cyanoethyl)-2-n-undecylimidazole, 1-(2-cyanoethyl)-2-phenylimidazole, 1-(2-cyanoethyl)-2-ethyl-4-methylimidazole, 2-phenyl-4-methyl-5-hydroxymethylimidazole, 2-phenyl-4,5-di(hydroxymethyl)imidazole, 1-(2-cyanoethyl)-2-phenyl-4,5-di[(2'-cyanoethoxy)methyl]imidazole, 1-(2-cyanoethyl)-2-n-undecylimidazolium trimellitate, 1-(2-cyanoethyl)-2-phenylimidazolium trimellitate, 1-(2-cyanoethyl)-2-ethyl-4-methylimidazolium trimellitate, 2,4-diamino-6-[2'-methylimidazolyl-(1')]ethyl-s-triazine, 2,4-diamino-6-(2'-n-undecylimidazolyl)ethyl-s-triazine, 2,4-diamino-6-[2'-ethyl-4'-methylimidazolyl-(1')]ethyl-s-triazine, 2-methylimidazole-isocyanuric acid adduct, 2-phenylimidazole-isocyanuric acid adduct, and 2,4-diamino-6-[2'-methylimidazolyl-(1')]ethyl-s-triazine-isocyanuric acid adduct; organic phosphorus compounds such as diphenylphosphine, triphenylphosphine, and triphenyl phosphite; quaternary phosphonium salts such as benzyltriphenylphosphonium chloride, tetra-n-butylphosphonium bromide, methyltriphenylphosphonium bromide, ethyltriphenylphosphonium bromide, n-butyltriphenylphosphonium bromide, tetraphenylphosphonium bromide, ethyltriphenylphosphonium iodide, ethyltriphenylphosphonium acetate, methyltributylphosphoniumdimethyl phosphate, tetrabutylphosphonium diethyl phosphodithionate, tetra-n-butylphosphonium benzotriazolate, tetra-n-butylphosphonium tetrafluoroborate, tetra-n-butylphosphonium tetraphenylborate, and tetraphenylphosphonium tetraphenylborate; diazabicycloalkenes such as 1,8-diazabicyclo[5.4.0]undecene-7 and organic acid salts thereof; organic metal compounds such as zinc octylate, tin octylate, and aluminum acetylacetonate complexes; quaternary ammonium salts such as tetraethyl ammonium bromide and tetra-n-butyl ammonium bromide; boron compounds such as boron trifluoride and triphenyl borate; dispersant latent curing accelerators having a high melting point such as metal halogen compounds including zinc chloride and stannic chloride, dicyandiamide, and amine adduct accelerators including amine-epoxy resin adducts; microencapsulated latent curing accelerators formed by encapsulating a curing accelerator such as any of the imidazoles, the organic phosphorus compounds, and the quaternary phosphonium salts as described above in a polymer; amine salt latent curing agent accelerators; and high-temperature dissociative and thermally and cationically polymerizable latent curing accelerators such as Lewis acid salts and Bronsted acid salts other than the gallium compounds.

1.5.4 Acid Anhydride

The thermosetting resin composition according to an embodiment of the present invention can include an acid anhydride as a curing aid. The type of the acid anhydride is not specifically limited, but in a case in which the resin composition is used in an optical semiconductor device, it is preferred to use cycloaliphatic carboxylic acid anhydrides in terms of light resistance.

Examples of the cycloaliphatic carboxylic acid anhydrides can include compounds represented by Formulas (25)-(30), 4-methyltetrahydrophthalic anhydride, methyl nadic anhydride, dodecenylsuccinic anhydride, Diels-Alder reaction products of a cycloaliphatic compound that has a conjugated double bond, such as α-terpinene and allo-ocimene, and maleic anhydride, and hydrogenated derivatives thereof.

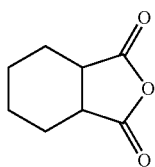
(25)

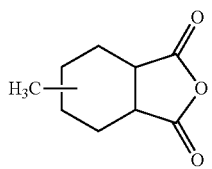
(26)

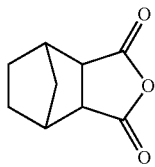
(27)

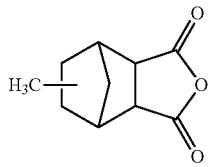
(28)

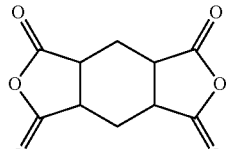
(29)

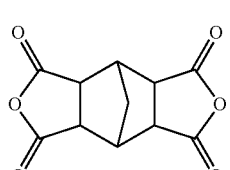
(30)

As the Diels-Alder reaction products and hydrogenated derivatives thereof, any structural isomers and any geometric isomers can be used.

The cycloaliphatic carboxylic acid anhydrides can also be chemically modified if appropriate, as long as the anhydrides do not substantially impair the curing reaction.

Inclusion of the acid anhydride may provide effects such as control of epoxy reaction rate, improved handling, improved leveling, and prevention of color. The acid anhydride is preferably contained in an amount of 1.5 equivalents or less, more preferably 1 equivalent or less, and still more preferably 0.8 equivalents or less based on the amount of the epoxy, although the amount is not limited thereto.

1.5.5 Silane Coupling Agent

The thermosetting resin composition of the present invention can include a silane coupling agent in order to provide good adhesion to a metal part and an inorganic filler.

The specific examples include 2-(3,4-epoxycyclohexyl) ethyl trimethoxysilane, vinyltriethoxysilane, vinyltrimethoxysilane, 3-glycidoxypropyl trimethoxysilane, γ-methacryloxypropyl trimethoxysilane, γ-aminopropyl trimethoxysilane, and N-phenyl-3-aminopropyl trimethoxysilane.

1.5.6 Condensation Catalyst for Silanol

A catalyst usually used for curing silanol can also be used, as long as such catalyst does not impair the epoxy reaction promoted by the catalyst function of the gallium compound and the silanol derived from the silanol source compound.

The specific examples include catalysts for dehydration-dealcoholization-condensation reaction. Such reaction catalysts preferably contain at least one selected from the group consisting of organic metal complex catalysts, salts of a metal and an organic acid, and Lewis acid and Lewis base catalysts. As a metal component contained in the catalysts for dehydration-dealcoholization-condensation reaction, it is preferred to use one or more metals selected from Sn, Zn, Fe, Ti, Zr, Bi, Hf, Y, Al, B, Ga, or the like. Among them, Sn, Ti, Al, Zn, Zr, Hf, and Ga are preferred due to their high reaction activity. Especially, in a case in which the composition of an embodiment of the present invention is used as a component of a light emitting device, Zr and Hf are preferred because such metals exhibit decreased electrode corrosion and decreased light absorption, have an appropriate catalytic activity, and tend to inhibit deterioration by unwanted scission of dimethyl polysiloxane chains.

2. Method for Producing Thermosetting Resin Composition

The thermosetting resin composition according to an embodiment of the present invention can be produced by mixing the above components (A)-(C) and, if necessary, other components such as a filler, a diluent, and an antioxidant.

The thermosetting resin composition may be a two-part curable composition in view of storage stability.

In the case of the two-part curable composition, for example, the A part can contain the epoxy compound, and the B part can contain the gallium compound and the silanol source compound. Alternatively, the A part can contain the epoxy compound and the silanol source compound, and the B part can contain the gallium compound. Alternatively, the A part can contain the epoxy compound and the gallium compound, and the B part can contain the silanol source compound.

3. Method for Curing Thermosetting Resin Composition

A method for heating the thermosetting resin composition according to an embodiment of the present invention to cure the composition is not specifically limited. For example, conventionally known methods such as hot air circulation, infrared heating, and high-frequency heating can be used.

The thermosetting resin composition may be heat-treated in any conditions without limitation, as long as the composition is cured as desired.

4. Applications of Thermosetting Resin Composition

Applications of the thermosetting resin composition according to an embodiment of the present invention is not specifically limited and can be used as an encapsulant or the like for various semiconductor devices including light emitting devices such as LED devices.

In light emitting devices, for example, the composition can be used in various applications such as an encapsulant for semiconductor light-emitting elements, an adhesive (die-bonding agent) for fixing a semiconductor light-emitting element to a package, a lead frame, or the like, a component of a package, and a highly reflective coating.

Depending on the application, another component can be added. For example, in a case in which the composition is used as a wavelength converter element, a phosphor, fumed silica, spherical silica, and/or the like can be added. In a case in which the composition is used as a die-bonding agent, a heat transfer agent, fumed silica, and/or the like can be added. In a case in which the composition is used as a component of a package and a highly reflective coating material, titania particles, alumina particles, and/or the like can be added.

Figure 5:
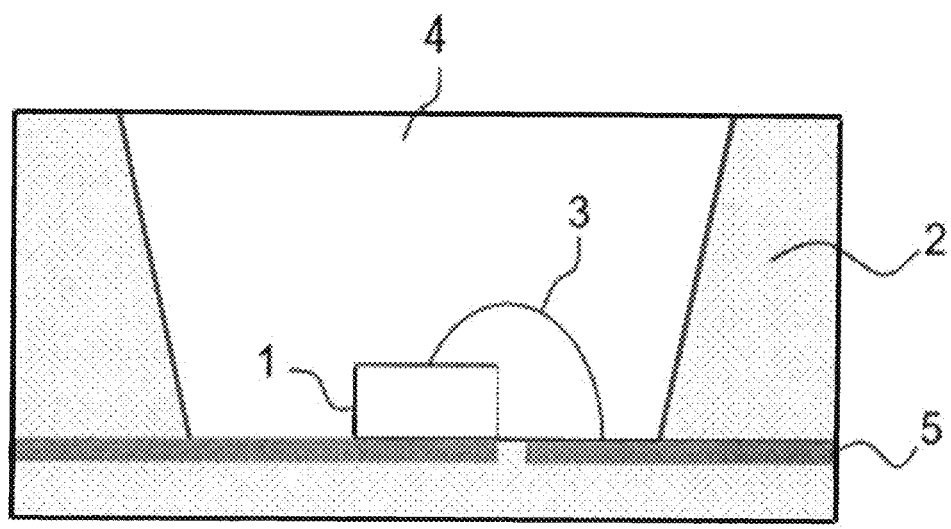
FIG. 5 is a cross-sectional view of a light emitting semiconductor device that can be produced by using a thermosetting resin composition according to an embodiment of the present invention.

For example, as illustrated by a cross-sectional view of FIG. 5, an LED device includes an LED element 1, a resin molding 2, a bonding wire 3, and an encapsulant 4 containing a phosphor, and a lead frame 5.

The LED element 1 is an InGaN LED that emits light with wavelengths in near-UV light, UV light, or blue region.

The resin molding 2 is molded together with the lead frame 5 and is cup-shaped.

The lead frame 5 includes a conductive metal. The frame is a component of the LED device and functions to conduct, to the LED element 1, the current that is provided from the exterior to the LED device.

The bonding wire 3 electrically connects the LED element 1 with one end of the lead frame.

The LED element 1 is adhesively fixed to other end of the lead frame by using a die-bonding agent having electrical conductivity imparted by addition of conductive particles, and is encapsulated with an encapsulant 4 that is mixed with a phosphor.

In the LED device illustrated in FIG. 5, the thermosetting resin composition according to an embodiment of the present invention can be used as a material of the resin molding 2, the encapsulant 4, and the die-bonding agent (not illustrated).

EXAMPLES

Now, the present invention will be described in detail with reference to Examples. First, the curing mechanism of the thermosetting resin compositions was identified.

1. Identification of Curing Mechanism

Attempts were made to identify a reaction caused by heating the epoxy compound in the presence of the gallium compound and the silanol source compound. The details are described below 1.1 Materials As the epoxy compound, cyclohexene oxide (from Wako Pure Chemical Industries, Ltd.) was used. This compound was a monofunctional epoxy compound and did not form a three dimensional cross linked structure when the compound was polymerized.

As the gallium compound, gallium acetylacetonate was used.

As the silanol, polymethylphenylsiloxane that had, at both ends, a silicon atom bonded to a hydroxy group and that had a polystyrene equivalent weight-average molecular weight of about 900 (FLD516 from Bluestar Silicones, hereinafter referred to as SOL-1), as represented by Formula (31) was used.

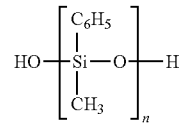

(31)

1.2 Samples

Samples 1-4 were prepared as described below.

0.59 g of SOL-1 was admixed with 5.03 g of cyclohexene oxide to obtain Sample 1.

In a Schlenk flask, Sample 1 (the mixture of 5.03 g of cyclohexene oxide and 0.59 g of SOL-1) was stirred under nitrogen at 120° C. for 7 hours to obtain Sample 2.

In a Schlenk flask, an admixture of 5.00 g of cyclohexene oxide with 0.002 g of gallium acetylacetonate (Ga(acac)$_3$) was stirred under nitrogen at 120° C. for 7 hours to obtain Sample 3.

0.047 g of gallium acetoacetonate was dissolved in 2.36 g of SOL-1 to obtain a 2.0% Ga(acac)$_3$ solution.

In a Schlenk flask, an admixture of 5.02 g of cyclohexene oxide with 0.104 g of the above Ga(acac)$_3$ solution and 0.498 g of SOL-1 was stirred under nitrogen at 120° C. for 7 hours to obtain Sample 4.

Sample 4 contained SOL-1 in an amount of 12 parts by weight based on 100 parts by weight of cyclohexene oxide, just the same as Samples 1 and 2. And Sample 4 contained Ga(acac)$_3$ in an amount of 0.04 parts by weight based on 100 parts by weight of cyclohexene oxide, just the same as Sample 3.

1.3 Measurement

The reaction rate of the epoxy group of Samples 1-4 was determined by $^1$H-NMR spectroscopy, and the presence of a cyclohexene oxide polymer is determined by GPC (gel permeation chromatography).

$^1$H-NMR spectroscopy was performed at a magnetic field of 400 MHz and a temperature of 25° C. by using AVANCE 400 from Bruker BioSpin K. K. Deuterated chloroform was used as the solvent, and the sample concentration was about 5 wt %. Tetramethylsilane was used as the reference material.

1.4 Analysis of $^1$H-NMR spectroscopy

The $^1$H-NMR spectra of Samples 1-4 are respectively shown in FIGS. 1-4.

The signal at 3.1 ppm derived from the epoxy methine group of the cyclohexene oxide and the signals at 1-2 ppm derived from the methylene group of the cyclohexene oxide were observed in all of the samples.

In Samples 1, 2, and 4, the signals at 0-0.4 ppm derived from the methyl group of SOL-1 and the signals at 7.0-7.6 ppm derived from the phenyl group of SOL-1 were observed.

In Sample 4, the signal derived from the oxymethine group was observed at 3.4 ppm. The ratio of integral intensities of the signals at 3.1 ppm and 3.4 ppm provided the estimate of the reaction rate of the epoxy group of the cyclohexene oxide (rate of conversion of the epoxy methine to the oxymethine), which was 38%.

1.5 Results of GPC

In Samples 1 and 2, the GPC chart had a peak derived from the cyclohexene oxide monomers and the peak derived from SOL-1. In Sample 3, the chart had only a peak derived from the cyclohexene oxide monomers.

On the other hand, in Sample 4, the GPC chart had a peak derived from the cyclohexene oxide polymer, which had a weight-average molecular weight (Mw) of 1800.

1.6 Discussion

The results of the GPC shows that only the case of heat-treating Sample 4 in the presence of gallium acetylacetonate and SOL-1 caused polymerization of the cyclohexene oxide. And only the $^1$H-NMR spectrum of Sample 4 had a signal derived from the oxymethine group (at 3.4 ppm). This shows that the polymerization reaction of the cyclohexene oxide caused in the presence of gallium acetylacetonate and SOL-1 was most likely to be the self-polymerization reaction involving ring-opening of the epoxy group.

Examples 1-4 and Comparative Examples 1-3

1. Evaluation of Curability

1.1 Materials

In this study, the following materials were used.

<Bifunctional Epoxy Compound>

As the bifunctional epoxy compound, 3,4-epoxycyclohexylmethyl-3',4'-epoxycyclohexane carboxylate [CEL2021P from Daicel Corp.] having a structure represented by Formula (32) was used (the compound is hereinafter referred to as EPC-1).

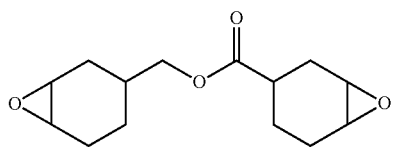

(32)

<Gallium Compound>

As the gallium compound, gallium acetylacetonate (from Strem Chemicals, Inc.), which was a trivalent gallium complex with acetylacetone was used. The compound may be sometimes referred to as gallium triacetylacetonate, tris(acetylacetonato)gallium, tris(2,4-pentanedionato)gallium, and the like. The compound may be also sometimes referred to as Ga(acac)$_3$.

<Silanol>

Three types of silanol compounds were used.

The first silanol compound was polymethylphenylsiloxane that had, at both ends, a silicon atom bonded to a hydroxy group and that had a polystyrene equivalent weight-average molecular weight of about 900 (FLD516 from Bluestar Silicones), as represented by Formula (33) (the compound is hereinafter referred to as SOL-1).

(33)

The second silanol compound was dihydroxydiphenylsilane [LS-4320 from Shin-Etsu Chemical Co., Ltd.] (the compound is herein referred to as SOL-2).

The third silanol compound was polydimethylsiloxane that had, at both ends, a silicon atom bonded to a hydroxy group and that had a polystyrene equivalent weight-average molecular weight of about 500 [XC96-723 from Momentive Performance Materials Japan LLC], as represented by Formula (34) (the compound is hereinafter referred to as SOL-3).

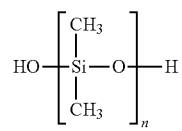

(34)

1.2 Compositions

The above materials were combined to prepare seven types of epoxy compositions (Compositions 1-7) having composition as shown in Table 1.

TABLE 1

| | | Composition (Weight ratios with the weight of EPC-1 set to 100 are shown in parentheses.) | | | | | |
|---|---|---|---|---|---|---|---|
| | | EPC-1 Weight (g) | Ga(acac)$_3$ Solution Weight (g) | Ga(acac)$_3$ Weight (g) | SOL-1 Weight (g) | SOL-2 Weight (g) | SOL-3 Weight (g) |
| Example 1 | Composition 1 | 3.003 (100) | 0.060 (2.0) | — (—) | 0.122 (4.1) | — (—) | — (—) |
| Example 2 | Composition 2 | 3.000 (100) | 0.060 (2.0) | — (—) | 0.298 (9.9) | — (—) | — (—) |
| Example 3 | Composition 3 | 4.995 (100) | — (—) | 0.002 (0.04) | — (—) | 0.100 (2.0) | — (—) |
| Example 4 | Composition 4 | 4.997 (100) | — (—) | 0.002 (0.04) | — (—) | — (—) | 0.300 (6.00) |
| Comparative Example 1 | Composition 5 | 4.997 (100) | — (—) | 0.002 (0.04) | — (—) | — (—) | — (—) |
| Comparative Example 2 | Composition 6 | 3.018 (100) | — (—) | — (—) | 0.059 (2.0) | — (—) | — (—) |
| Comparative Example 3 | Composition 7 | 4.992 (100) | — (—) | — (—) | — (—) | 0.101 (2.0) | — (—) |

In Table 1, the Ga(acac)$_3$ solution was a 2.0% by weight gallium acetylacetonate solution obtained by dissolving 0.047 g of gallium acetylacetonate in 2.36 g of SOL-1.

Compositions 1 and 2 were prepared by mixing the Ga(acac)$_3$ solution with EPC-1, while Compositions 3-5 were prepared by directly dissolving solid gallium acetylacetonate in EPC-1. For any of Compositions 1-5, the same amount of gallium acetylacetonate was used, based on the weight of EPC-1.

1.3 Evaluation of Curability

To evaluate curability, the seven types of epoxy compositions shown in Table 1 were heat-treated as described below and measured for gelation rate.

Due to the high solubility of EPC-1 in THF (tetrahydrofuran), the gelation rate was defined as the weight ratio of the component that was contained in the epoxy compositions and that was insoluble in THF after heat-treatment.

Following is the procedure for the heat treatment and the measurement of the gelation rate.

<Heat Treatment>

About 2 g of each of the epoxy compositions was placed in an aluminum cup having an inner diameter of 5 cm, and the cup was held in a constant temperature bath at 120° C. for 30 minutes and then at 150° C. for 150 minutes.

<Measurement of Gelation Rate>

After the heat treatment described above, 50 g of THF (tetrahydrofuran) was added to 1.0 g of the epoxy composition and stirred at room temperature. After stirring for an hour, a component insoluble in THF was collected by filtration with suction. The insoluble component was dried in vacuum at 80° C. and weighed. The gelation rate was calculated by dividing the weight of the component insoluble in THF by the weight of the epoxy composition before adding THF (1.0 g).

<Evaluation of Fluidity after Heat Treatment>

The aluminum cup containing the epoxy composition was removed from the constant temperature bath. When the temperature decreased to room temperature, the aluminum cup was inclined at about 45 degrees. When the epoxy composition contained in the cup flowed, the composition was considered as "fluid", while when the epoxy composition did not flow, the composition was considered as "not fluid".

The results are shown in Table 2.

TABLE 2

|  |  | Fluidity After Heat Treatment | Gelation Rate (%) |
|---|---|---|---|
| Example 1 | Composition 1 | Not Fluid | 94 |
| Example 2 | Composition 2 | Not Fluid | 99 |
| Example 3 | Composition 3 | Not Fluid | 98 |
| Example 4 | Composition 4 | Not Fluid | 98 |
| Comparative Example 1 | Composition 5 | Fluid | 0 |
| Comparative Example 2 | Composition 6 | Fluid | 0 |
| Comparative Example 3 | Composition 7 | Fluid | 0 |

1.4 Discussion

As shown in Table 2, only Compositions 1-4 lost fluidity after heat treatment and had a gelation rate of more than 90%.

Compositions 1-4 had in common that they contained both of gallium acetylacetonate and silanol.

In contrast, Composition 5 that contained gallium acetylacetonate but not silanol and Compositions 6 and 7 that contained silanol but not gallium acetylacetonate kept fluidity after heat treatment and had a gelation rate of zero %.

The results may demonstrate that presence of both of gallium acetylacetonate and silanol is a condition required to cause polymerization of EPC-1, which is a bifunctional epoxy compound, to form a three dimensional cross linked structure.

Additionally, it is believed that polycondensation of SOL-1, SOL-2, and SOL-3 catalyzed by gallium acetylacetonate cannot be a major factor of thermal curing of Compositions 1-4. One of the reasons are that SOL-1, SOL-2, and SOL-3 were contained in Compositions 1-4 in an amount that was no more than a tenth of the amount of EPC-1 by weight. And all of SOL-1, SOL-2, and SOL-3 had two silanol hydroxy groups per molecule and did not form a three dimensional cross linked structure upon polycondensation. However, this does not rule out the possibility of polycondensation of SOL-1, SOL-2, and SOL-3 in Compositions 1-4.

Examples 5-9

Synthesis Example 1

23.0 g of hydroxy-terminated methylphenylpolysiloxane having a Mw of 900, 60 g of 2-(3,4-epoxycyclohexyl)ethyl trimethoxysilane as the epoxy group-containing alkoxysilane, 0.250 g of 1,8-diazabicyclo[5.4.0]-7-undecene, and 50 g of toluene were mixed and then heated under stirring at 50° C. for 9 hours. Then, the reactant was neutralized with an aqueous sodium dihydrogen phosphate solution (10% by mass). After washing with water until the washings were neutral, the volatiles were removed under reduced pressure to obtain polysiloxane EPSi-1.

Synthesis Example 2

64.8 g of 2-(3,4-epoxycyclohexyl)ethyl trimethoxysilane, 40.1 g of trimethylethoxysilane, 45 g of isopropyl alcohol, and 24.39 g of 1N hydrochloric acid were mixed and stirred at room temperature for 3 hours. Additionally, 1.51 g of potassium hydroxide and 148 g of isopropyl alcohol were added, and heated under stirring under refluxing conditions for isopropyl alcohol for 4 hours. Then, the reactant was neutralized with an aqueous sodium dihydrogen phosphate solution (10% by mass). After washing with water until the washings were neutral, the volatiles were removed under reduced pressure to obtain polysiloxane EPSi-2 having a Mw of 1000.

YX-4000H (from Mitsubishi Chemical Corp.), which had a structure represented by Formula (35), was used (the compound is hereinafter referred to as EPC-2).

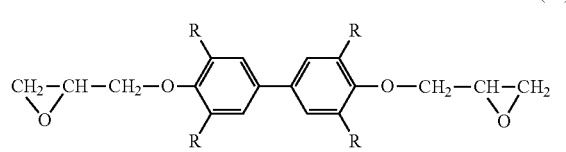

(35)

The above materials were combined to prepare five types of epoxy compositions (Compositions 8-12) having composition as shown in Table 3.

TABLE 3

| | | Composition (Weight ratios with the weight of EPSi-1 or EPSi-2 set to 100 are shown in parentheses.) | | | | | |
|---|---|---|---|---|---|---|---|
| | | EPSi-1 Weight (g) | EPSi-2 Weight (g) | EPC-2 Weight (g) | Ga(acac)$_3$ Solution Weight (g) | Acid Anhydride MH-700 (RICACID MH-700 from New Japan Chemical Co., Ltd.) Weight (g) | Spherical Silica Filler Weight (g) |
| Example 5 | Composition 8 | 0.900 (100) | — (—) | 0.090 (10) | 0.025 (2.8) | — (—) | — (—) |
| Example 6 | Composition 9 | 0.760 (100) | — (—) | 0.090 (12) | 0.025 (3.3) | 0.140 (18) | — (—) |
| Example 7 | Composition 10 | 0.900 (100) | — (—) | 0.090 (10) | 0.025 (2.8) | — (—) | 3.000 (333) |
| Example 8 | Composition 11 | — (—) | 3.000 (100) | — (—) | 0.025 (0.8) | — (—) | — (—) |
| Example 9 | Composition 12 | — (—) | 0.760 (100) | 0.027 (4) | 0.025 (3.3) | 0.140 (18) | 3.000 (395) |

As the filler, MSR-SF630 spherical filler (from Tatsumori Ltd.) was used.

The fluidity was evaluated in accordance with Example 1 described above. In Examples 5-9, hardness after heat treatment was also measured. The hardness was measured in accordance with JIS K6253. The Shore A hardness was measured by using Asker Rubber Hardness Tester Model A (from Kobunshi Keiki Co., Ltd.) as a hardness tester and Constant Loader for Durometer CL-150 (from Kobunshi Keiki Co., Ltd.) as a load applicator,

TABLE 4

| Example | Composition | Fluidity After Heat Treatment | Shore A Hardness After Heat Treatment |
|---|---|---|---|
| Example 5 | Composition 8 | Not Fluid | >90 |
| Example 6 | Composition 9 | Not Fluid | >90 |
| Example 7 | Composition 10 | Not Fluid | >90 |
| Example 8 | Composition 11 | Not Fluid | >90 |
| Example 9 | Composition 12 | Not Fluid | >90 |

As shown in Table 4, heat treatment led to loss of the fluidity of Compositions 8-12, which had a hardness (Shore A hardness) after heat treatment of more than 90.

Synthesis Example 3

50.0 g of hydroxy-terminated methylphenylpolysiloxane having a Mw of 900, 3.45 g of 2-(3,4-epoxycyclohexyl)ethyl trimethoxysilane as the epoxy group-containing alkoxysilane, 0.250 g of 1,8-diazabicyclo[5.4.0]-7-undecene, and 5.94 g of toluene were mixed and heated under stirring at 50° C. for 9 hours. Then, the reactant was neutralized with an aqueous sodium dihydrogen phosphate solution (10% by mass). After washing with water until the washings were neutral, the volatiles were removed under reduced pressure to obtain polysiloxane (A)-1 having a Mw of 20000.

The resultant polysiloxane (A)-1 is represented by Formula (36), wherein a is 0, b is 0.963, c is 0.0367, and d is 0.

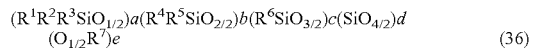

(36)

Synthesis Example 4

50.0 g of hydroxy-terminated methylphenylpolysiloxane having a Mw of 900, 0.91 g of phenyltrimethoxysilane, 0.25 g of 1,8-diazabicyclo[5.4.0]-7-undecene, and 21.8 g of toluene were mixed and heated under stirring at 80° C. for 6 hours. Then, the reactant was neutralized with an aqueous sodium dihydrogen phosphate solution (10% by mass). After washing with water until the washings were neutral, the volatiles were removed under reduced pressure to obtain polysiloxane (B)-1 having a Mw of 13000.

The resultant polysiloxane (B)-1 is represented by Formula (37), wherein a1 is 0, b1 is 0.987, c1 is 0.0132, and d1 is 0.

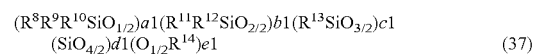

(37)

Synthesis Example 5

40.0 g of hydroxy-terminated methylphenylpolysiloxane having a Mw of 900, 7.90 g of 2-(3,4-epoxycyclohexyl)ethyl trimethoxysilane as the epoxy group-containing alkoxysilane, 0.400 g of 1,8-diazabicyclo[5.4.0]-7-undecene, and 17.0 g of 2-propanol were mixed and heated under stirring at 80° C. for 5 hours. Then, the reactant was neutralized with an aqueous sodium dihydrogen phosphate solution (10% by mass). After washing with water until the washings were neutral, the volatiles were removed under reduced pressure to obtain polysiloxane (A)-2 having a Mw of 2500.

The resultant polysiloxane (A)-2 is represented by above Formula (36), wherein a is 0, b is 0.902, c is 0.0984, and d is 0.

Examples 10-14 and Comparative Examples 4 and 5

The respective components described below were combined at the ratio shown in Table 5 to prepare thermosetting resin compositions in the following manner. Following are the components used.

(A) Polysiloxanes that have an epoxy group
(A)-1: Polysiloxane produced in Synthesis Example 3
(A)-2: Polysiloxane produced in Synthesis Example 5
(B) Polysiloxanes that have an aromatic group
(B)-1: Polysiloxane produced in Synthesis Example 4
(B)-2: hydroxy-terminated methylphenylpolysiloxane (Mw=900)
(C) Gallium Compound ((C)-2 was another curing catalyst.)
(C)-1: Gallium acetylacetonato
(C)-2: Aluminum ethylacetylacetonato (D) Acid Anhydride Compound
(D)-1: 4-methylhexahydrophthalic anhydride/hexahydrophthalic anhydride mixture MH700 (from New Japan Chemical Co., Ltd.)
(In Table 5, f represents a molar ratio of the acid anhydride to the total amount of epoxy in the compositions.)
(E) Epoxy Compound
(E)-1: 3,4-epoxycyclohexylmethyl-3',4'-epoxycyclohexane carboxylate The respective polysiloxane that has an epoxy group or the respective polysiloxane that has an aromatic group, the respective acid anhydride compound, and the respective epoxy compound were combined at the ratio (by weight) shown in Table 5 and mixed at room temperature under the atmosphere. After stirring until homogeneous, the gallium compound (C) was added and further stirred.

The resultant was heated at 80° C. for 0.5 hours and then at 150° C. for 2.5 hours for a curing test.

TABLE 5

|  | Example 10 | Example 11 | Example 12 | Example 13 | Example 14 | Comparative Example 4 | Comparative Example 5 |
|---|---|---|---|---|---|---|---|
| (A)-1 | — | — | 1.7 | 1.7 | 1.7 | 1.7 | 1.7 |
| (A)-2 | 0.55 | 0.55 | — | — | — | — | — |
| (B)-1 | — | 0.5225 | — | 1.054 | — | 1.054 | — |
| (B)-2 | 0.011 | 0.011 | 0.043 | 0.043 | 0.043 | 0.043 | 0.043 |
| (C)-1 | 0.00022 | 0.00022 | 0.00086 | 0.00086 | 0.00086 | — | — |
| (C)-2 | — | — | — | — | — | 0.00086 | 0.00086 |
| (D)-1 | 0.0154 | 0.0154 | 0.120 | 0.129 | 0.463 | 0.129 | — |
|  | f = 0.25 | f = 0.25 | f = 0.25 | f = 0.25 | f = 0.9 | f = 0.25 |  |
| (E)-1 | — | — | 0.34 | 0.34 | 0.34 | 0.34 | 0.34 |

The thermosetting resin compositions shown in Table 5 were cured in the manner described above, and the cure state of the resultant cured products were observed. The results are shown in Table 6.

TABLE 6

|  | Example 10 | Example 11 | Example 12 | Example 13 | Example 14 | Comparative Example 4 | Comparative Example 5 |
|---|---|---|---|---|---|---|---|
| Cure State | Good | Good | Good | Good | Good | Not Cured | Gelated |

As shown by the results in Table 6, the compositions using the aluminum ethylacetylacetonato (C)-2 in place of the gallium acetylacetonato (C)-1 exhibited poor film curing and excessively quick reaction, and gelated upon stirring at room temperature.

Synthesis Example 6

37.6 g of 2-(3,4-epoxycyclohexyl)ethyl trimethoxysilane, 14.6 g of hydroxy-terminated dimethyl polysiloxane having a Mw of 700, 22.5 g of isopropyl alcohol, and 11.00 g of 1N hydrochloric acid were mixed and stirred at room temperature for 3 hours. Additionally, 0.74 g of potassium hydroxide and 160 g of isopropyl alcohol were added and heated under stirring under refluxing conditions for the isopropyl alcohol for 4 hours. Then, the reactant was neutralized with an aqueous sodium dihydrogen phosphate solution (10% by mass). After washing with water until the washings were neutral, the volatiles were removed under reduced pressure to obtain polysiloxane EPSi-3 having a Mw of 2000.

The respective polysiloxane and the respective acid anhydride compound were combined as shown in Table 7 and mixed at room temperature under the atmosphere. After stirring until homogeneous, the gallium compound or the aluminum compound was added and further stirred.

TABLE 7

|  | EPSi-2 | EPSi-3 | SOL-1 | Gallium Acetate | Ga(acac)$_3$ | Al(acac)$_3$ | MH700 |
|---|---|---|---|---|---|---|---|
| Example 15 | 3.000 |  | 0.120 |  | 0.002 |  |  |
| Example 16 |  | 3.000 | 0.120 |  | 0.002 |  |  |

TABLE 7-continued

|  | EPSi-2 | EPSi-3 | SOL-1 | Gallium Acetate | Ga(acac)$_3$ | Al(acac)$_3$ | MH700 |
|---|---|---|---|---|---|---|---|
| Example 17 | 3.000 |  | 0.120 | 0.002 |  |  |  |
| Example 18 | 3.000 |  | 0.120 |  | 0.002 |  | 0.553 |
| Comparative Example 6 | 3.000 |  | 0.120 |  |  |  |  |
| Comparative Example 7 | 3.000 |  | 0.120 |  |  | 0.002 |  |

The resultants were heated at 80° C. for 0.5 hours and then at 150° C. for 2.5 hours for a curing test.

The fluidity and the gelation rate were evaluated in accordance with Example 1 described above.

The results are shown in Table 8.

TABLE 8

|  | Fluidity After Heating | Gelation Rate (%) | Cure State |
|---|---|---|---|
| Example 15 | Not Fluid | 100 | Good |
| Example 16 | Not Fluid | 99 | Good |
| Example 17 | Not Fluid | 95 | Good |
| Example 18 | Not Fluid | 99 | Good |
| Comparative Example 6 | Fluid | 0 | Not Cured |
| Comparative Example 7 | Not Fluid |  | Gelated at Room Temperature |

As shown by the results in Table 8, the composition using gallium acetate in place of the gallium acetylacetonato exhibited a good cure state, while the composition using aluminum ethylacetylacetonato exhibited excessively quick curing reaction and gelated upon stirring at room temperature. The composition free of the gallium acetylacetonato maintained the fluidity even after heating and had a gelation rate of zero %.

While the invention has been described in detail and with reference to specific embodiments thereof, it will be apparent to one skilled in the art that various changes and modifications can be made therein without departing from the spirit and scope thereof.

DESCRIPTION OF THE REFERENCE NUMERAL

1 LED element
2 resin molding
3 bonding wire
4 encapsulant
5 lead frame

What is claimed is:

1. A thermosetting resin composition comprising an epoxy compound, a gallium compound, and a silanol source compound, wherein
said gallium compound. is gallium triacetylacetylacetonate or gallium acetate, and
said silanol source compound comprises a monosilane compound and/or an organopolysiloxane of formula (19):

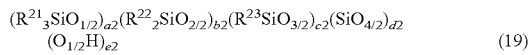

(19)

where
$R^{21}$, $R^{22}$, and $R^{23}$ each independently represent a $C_{1-10}$ hydrocarbon group,
a2, b2, c2, and d2 are each an integer of 0 or more and satisfy the condition of a2+b2+c2+d2≥3, and
e2 is a natural number of 1 or more and represents the number of a hydroxy group (s) directly bonded to a silicon atom.

2. The thermosetting resin composition according to claim 1, wherein the epoxy compound is a cycloaliphatic epoxy compound.

3. The thermosetting resin composition according to claim 1, wherein the silanol source compound is an organopolysiloxane of Formula (19).

4. The thermosetting resin composition according to claim 1, wherein the silanol source compound is a monosilane compound.

5. The thermosetting resin composition according to claim 1, wherein the gallium compound is a gallium complex that has a chelating ligand.

6. A method for producing a cured resin, the method comprising a step of heating an epoxy compound in the presence of a gallium compound and a silanol source compound, wherein
said gallium compound is gallium triacetylacetonate or gallium acetate, and
said silanol source compound comprises a monosilane compound and/or an organopolysiloxane of Formula (191):

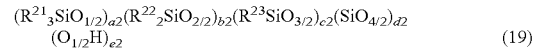

(19)

Where
$R^{21}$, $R^{22}$, and $R^{23}$ each independently represent a $C_{1-10}$ hydrocarbon group, a2, b2, c2, and d2 are each an integer of 0 or more and satisfy the condition of a2+b2+c2+d2≥3, and
e2 is a natural number of 1 or more and represents the number of hydroxyl group(s) directly bonded to a silicon atom.

7. The method according to claim 6, wherein the epoxy compound is a cycloaliphatic epoxy compound.

8. The method according to claim 6, wherein an organopolysiloxane of Formula (19) is used as a source of the silanol.

9. The method according to claim 6, wherein a monosilane compound is used as a source of the silanol.

10. The method according to claim 6, wherein a gallium complex that has a chelating ligand is used as the gallium compound.

11. A method for causing self-polymerization of an epoxy compound, the method comprising a step of adding a gallium compound and a silanol source compound as catalysts, wherein
said gallium compound is gallium triacetylacetonate or gallium acetate, and said silanol source compound comprises a monosilane compound and/or an organopolysiloxane of Formula (19):

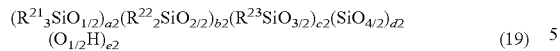  (19)

where $R^{21}$, $R^{22}$, and $R^{23}$ each independently represent a $C_{1\text{-}10}$ hydrocarbon group, a2, b2, c2, and d2 are each an integer of 0 or more and satisfy the condition of a2+b2+c2+d2≥3, and e2 is a natural number of 1 or more and represents the number of hydroxyl group(s) directly bonded to a silicon atom.

12. The method according to claim 11, wherein the epoxy compound is a cycloaliphatic epoxy compound.

13. The method according to claim 11, wherein an organopolysiloxane of Formula (19) is used as a source of the silanol.

14. The method according to claim 11, wherein a monosilane compound is used as a source of the silanol.

15. The method according to claim 11, wherein the gallium compound is a gallium complex that has a chelating ligand.

* * * * *